United States Patent
Takagi et al.

(10) Patent No.: US 8,666,631 B2
(45) Date of Patent: Mar. 4, 2014

(54) VEHICLE TRAVEL CONTROL DEVICE

(75) Inventors: Toshihiro Takagi, Susono (JP);
Yasuhiro Kuze, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 57 days.

(21) Appl. No.: 13/203,898

(22) PCT Filed: Apr. 8, 2009

(86) PCT No.: PCT/JP2009/057195
§ 371 (c)(1),
(2), (4) Date: Aug. 30, 2011

(87) PCT Pub. No.: WO2010/116499
PCT Pub. Date: Oct. 14, 2010

(65) Prior Publication Data
US 2012/0065863 A1    Mar. 15, 2012

(51) Int. Cl.
*G05D 1/00* (2006.01)
*B60T 8/32* (2006.01)
*G08G 1/16* (2006.01)

(52) U.S. Cl.
USPC .............................. 701/96; 701/93; 701/301

(58) Field of Classification Search
USPC ............................................ 701/93, 96, 301
See application file for complete search history.

(56) References Cited

U.S. PATENT DOCUMENTS

| 5,128,869 | A | 7/1992 | Akishino et al. |
| 6,185,499 | B1 | 2/2001 | Kinoshita et al. |
| 8,280,560 | B2 * | 10/2012 | Huang et al. ...................... 701/1 |
| 2004/0215385 | A1 * | 10/2004 | Aizawa et al. .................. 701/93 |
| 2006/0229793 | A1 | 10/2006 | Sawamoto et al. |
| 2010/0070151 | A1 * | 3/2010 | Sonoda et al. .................. 701/96 |

FOREIGN PATENT DOCUMENTS

| DE | 102 61 624 A1 | 7/2004 |
| DE | 10 2007 031 556 A1 | 1/2009 |
| JP | A-01-168531 | 7/1989 |
| JP | A-08-017000 | 1/1996 |
| JP | A-10-318009 | 12/1998 |
| JP | A-11-059221 | 3/1999 |
| JP | A-2002-500980 | 1/2002 |
| JP | A-2004-216964 | 8/2004 |
| JP | A-2004-216965 | 8/2004 |
| JP | A-2006-290150 | 10/2006 |
| JP | A-2009-248597 | 10/2009 |

OTHER PUBLICATIONS

International Search Report issued in Application No. PCT/JP2009/057195; Dated May 19, 2009 (With Translation).

* cited by examiner

*Primary Examiner* — Khoi Tran
*Assistant Examiner* — Robert Nguyen
(74) *Attorney, Agent, or Firm* — Oliff PLC

(57) ABSTRACT

The vehicle travel control device according to the invention is a vehicle travel control device that controls the travel of a host vehicle based on any of inter-vehicle distance setting and vehicle speed setting that are setting information set in advance, in which the inter-vehicle distance setting and the vehicle speed setting can be updated individually in accordance with the operation of an accelerator pedal or a brake pedal in the host vehicle, and setting information to be updated are selected based on the changes in the travelling conditions of the host vehicle or a leading vehicle.

10 Claims, 10 Drawing Sheets

(a)

(b)

VEHICLE TRAVEL CONTROL DEVICE

TECHNICAL FIELD

The present invention relates to a vehicle travel control device that controls the travel of a vehicle based on any of the inter-vehicle distance setting and vehicle speed setting that are setting information set in advance.

BACKGROUND ART

In the past, as a technology in this field, a inter-vehicle distance control device as described in Japanese Unexamined Patent Application Publication No. 2004-216965 has been known. The device in this Patent Literature stops the control of inter-vehicle distances when the accelerator sensor detects the start of an accelerator operation. In addition, the device resumes control of the inter-vehicle distances when the accelerator sensor detects the end of the accelerator operation. Here, it is suggested that, by using the inter-vehicle distance at the end of the accelerator operation as the inter-vehicle distance setting set at the resumption of control, driver can easily set desired inter-vehicle distances.

CITATION LIST

Patent Literature 1

Japanese Unexamined Patent Application Publication No. 2004-216965

SUMMARY OF INVENTION

Technical Problem

However, when both the vehicle speed setting and inter-vehicle distance setting are used as the standards for vehicle travel control, it is necessary to set the vehicle speed and inter-vehicle distance individually, and settings desired by a driver when performing pedal operations are also complexly varied according to the travelling conditions of a host vehicle and the travelling conditions of the leading vehicle. In contrast to the above, the device in Patent Literature 1 simply sets the inter-vehicle distance setting with the inter-vehicle distance at the end of an accelerator operation automatically, and thus it is difficult to sufficiently reflect in the settings an intention of the driver through the pedal operation.

Therefore, an object of the invention is to provide a vehicle travel control device that can reflect an intention of a driver in the setting information for vehicle travel control.

Solution to Problem

The vehicle travel control device of the invention is a vehicle travel control device that controls the travel of a host vehicle based on any of the inter-vehicle distance setting and vehicle speed setting that are setting information set in advance, in which the inter-vehicle distance setting and the vehicle speed setting can be updated individually in accordance with pedal operation of the accelerator pedal or brake pedal in a host vehicle, and setting information to be updated are selected based on the changes in the travelling conditions of the host vehicle and/or the changes in the travelling conditions of a leading vehicle before and after the pedal operation.

In the vehicle travel control device, the setting information (inter-vehicle distance setting and vehicle speed setting) that operate as the standards of the travel control of a host vehicle can be updated in accordance with pedal operation. Setting information to be updated in accordance with pedal operation are selected based on predetermined conditions. In this case, since the changes in the travelling conditions of the host vehicle and/or the changes in the travelling conditions of the leading vehicle are considered when setting information to be updated are selected, setting information in accordance with an intention of the driver of the host vehicle when performing a pedal operation are easily selected. Therefore, according to the vehicle travel control device, it is possible to realize setting of setting information that reflects an intention of the driver.

Also, in the vehicle travel control device, in a case in which the deceleration of the leading vehicle exceeds a predetermined threshold value when the pedal operation is performed in the host vehicle, the vehicle speed setting may be selected as the setting to be updated, and then be updated in accordance with the pedal operation.

When a pedal operation is performed in a host vehicle with a leading vehicle undergoing a large deceleration, it can be considered that the driver of the host vehicle performs the pedal operation with the intention of adjusting the speed of the host vehicle. Therefore, in this case, it is possible to reflect an intention of the driver in the settings by updating the vehicle speed setting.

Also, in this case, in a case in which the deceleration of the leading vehicle does not exceed the predetermined threshold value when the pedal operation is performed in the host vehicle, the inter-vehicle distance setting may be selected as the setting to be updated and be updated in accordance with the pedal operation.

When a pedal operation is performed in a host vehicle with a leading vehicle undergoing a small deceleration, it can be considered that the driver of the host vehicle performs the pedal operation with the intention of adjusting the inter-vehicle distance from the leading vehicle. Therefore, in this case, it is possible to reflect an intention of the driver in the settings by updating the inter-vehicle distance setting.

Also, in the vehicle travel control device, in a case in which the inter-vehicle distance between the host vehicle and the leading vehicle at the end of the pedal operation becomes shorter than the inter-vehicle distance at the start of the pedal operation, vehicle speed setting may be selected as the setting to be updated and then be updated in accordance with the pedal operation.

When a pedal operation is performed in a state in which the inter-vehicle distance between the host vehicle and the leading vehicle is to be shortened before and after the pedal operation, it can be considered that the driver of the host vehicle performs the pedal operation with the intention of adjusting the vehicle speed of the host vehicle. Therefore, in this case, it is possible to reflect an intention of the driver in the settings by updating the vehicle speed setting.

Also, in this case, when the inter-vehicle distance between the host vehicle and the leading vehicle at the end of the pedal operation does not become shorter than the inter-vehicle distance at the start of the pedal operation, the inter-vehicle distance setting may be selected as the setting to be updated and be updated in accordance with the pedal operation.

When a pedal operation is performed in a state in which the inter-vehicle distance between the host vehicle and the leading vehicle does not become shorter before and after the pedal operation, it can be considered that the driver of the host vehicle performs the pedal operation with the intention of adjusting the inter-vehicle distance from the leading vehicle.

Therefore, in this case, it is possible to reflect an intention of the driver in the settings by updating the inter-vehicle distance setting.

Also, in the vehicle travel control device, in a case in which the amount of change in the speed of the host vehicle before and after a pedal operation exceeds a predetermined threshold value, the vehicle speed setting may be selected as the setting to be updated and be updated in accordance with the pedal operation.

When a pedal operation is performed in a state in which the speed of the host vehicle significantly changes before and after the pedal operation, it can be considered that the driver of the host vehicle performs the pedal operation with the intention of adjusting the vehicle speed of the host vehicle. Therefore, in this case, it is possible to reflect an intention of the driver in the settings by updating the vehicle speed setting.

Also, in this case, in a case in which the amount of change in the speed of the host vehicle before and after a pedal operation does not exceed a predetermined threshold value, the inter-vehicle distance setting may be selected as the setting to be updated and then be updated in accordance with the pedal operation.

When a pedal operation is performed in the host vehicle in a state in which the speed of the host vehicle does not significantly change before and after the pedal operation, it can be considered that the driver of the host vehicle performs the pedal operation with the intention of adjusting the inter-vehicle distance from the leading vehicle. Therefore, in this case, it is possible to reflect an intention of the driver in the settings by updating the inter-vehicle distance setting.

Also, in the vehicle travel control device, in a case in which an index indicating the relative relationship between the host vehicle and the leading vehicle changes to an extent exceeding a predetermined threshold value after a pedal operation, the vehicle speed setting may be selected as the setting to be updated and then be updated in accordance with the pedal operation.

Also, in this case, in a case in which an index indicating the relative relationship between the host vehicle and the leading vehicle does not change to an extent exceeding the predetermined threshold value after a pedal operation, the inter-vehicle distance setting may be selected as the setting to be updated and then be updated in accordance with the pedal operation.

Since it can be considered that an intention of the driver of the host vehicle varies with the change in the relative relationship between the host vehicle and the leading vehicle when a pedal operation is performed, it is possible to reflect an intention of the driver in the settings by determining which of the vehicle speed setting and inter-vehicle distance setting are to be updated based on the index indicating the relative relationship.

Specifically, the index indicating the relative relationship may be a difference in the vehicle speed between a host vehicle and the leading vehicle.

When a pedal operation is performed in a state in which the difference in the vehicle speed between a host vehicle and the leading vehicle becomes larger after the pedal operation, it can be considered that the driver of the host vehicle performs the pedal operation with the intention of adjusting the vehicle speed of the host vehicle. Therefore, in this case, it is possible to reflect an intention of the driver in the settings by updating the vehicle speed setting.

In addition, specifically, the index indicating the relative relationship may be the inter-vehicle distance between the host vehicle and the leading vehicle.

When the inter-vehicle distance between the host vehicle and the leading vehicle becomes larger than a threshold value after the pedal operation, it can be considered that the driver of the host vehicle does not regard the leading vehicle as an object to follow. Therefore, it can be considered that the driver of the host vehicle performs the pedal operation with the intention of adjusting the vehicle speed of the host vehicle. Therefore, in this case, it is possible to reflect an intention of the driver in the settings by updating the vehicle speed setting.

Advantageous Effects of Invention

According to the vehicle travel control device of the invention, it is possible to reflect an intention of a driver in the setting information for vehicle travel control.

DESCRIPTION OF EMBODIMENTS

Hereinafter, embodiments of the vehicle travel control device according to the invention will be described with reference to the accompanying drawings. In each of the embodiments below, the vehicle travel control device according to the invention will be applied to a full speed range adaptive cruise control (ACC) system mounted in a vehicle.

First Embodiment

Figure 1:
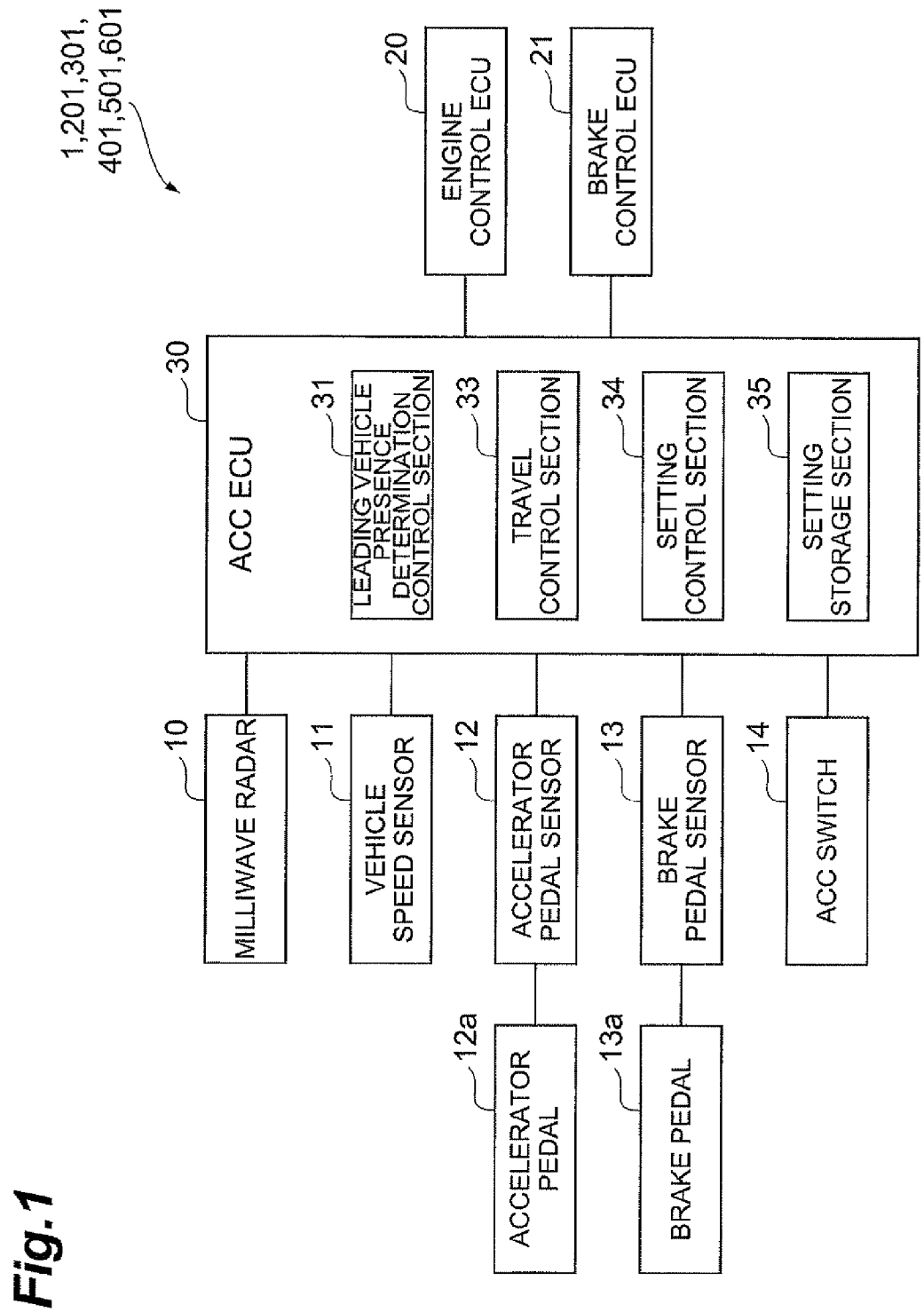
FIG. 1 is a block diagram showing the configuration of an adaptive cruise control (ACC) system according to an embodiment of the vehicle travel control device of the invention.

In an ACC system 1 shown in FIG. 1, when a vehicle is present in front of the host vehicle, a following control of the leading vehicle is implemented so that the inter-vehicle time gap with the leading vehicle becomes the inter-vehicle time gap set in advance. In addition, when no vehicle is present in front of the host vehicle, a constant speed control is implemented so that the speed of the host vehicle becomes the vehicle speed set in advance. However, in the case of the following control of the leading vehicle, that the speed of the host vehicle is maintained at a set vehicle speed or lower takes priority. That is, when the vehicle speed for maintaining the inter-vehicle time gap with the leading vehicle at the set inter-vehicle time gap exceeds the set vehicle speed, the constant speed control is implemented.

The ACC system 1 includes a milliwave radar 10, a vehicle speed sensor 11, an accelerator pedal sensor 12, a brake pedal sensor 13, an ACC switch 14, an engine control electronic control unit (ECU) 20, a brake control ECU 21, and an ACC ECU 30.

The milliwave radar 10 is a radar that detects objects using milliwaves. The milliwave radar 10 is attached to the center of the front side of a host vehicle. The milliwave radar 10 transmits milliwaves forward from the host vehicle while scanning in a horizontal plane and receives milliwaves reflected back. In addition, the milliwave radar 10 transmits transmission and reception information of the milliwaves to the ACC ECU 30 as radar signals. The milliwave radar 10 can detect vehicles traveling in front of a host vehicle, and, in this case, the ACC ECU 30 can detect the inter-vehicle distances from the leading vehicle based on the radar signals.

The vehicle speed sensor 11 is a wheel speed sensor that detects the rotation speed of the wheels. The vehicle speed sensor 11 transmits the rotation speed to the ACC ECU 30 or the like as vehicle speed signals. Meanwhile, the ACC ECU 30 calculates the speed of a host vehicle from the rotation speed of the wheels. Furthermore, the ACC ECU 30 calculates acceleration or deceleration from the change in the speed of the host vehicle over time. The acceleration (deceleration) may be detected using an acceleration sensor.

The accelerator pedal sensor 12 is a sensor that detects the amount an accelerator pedal 12a is depressed (accelerator opening degree). The accelerator pedal sensor 12 transmits the detected amount of depression to the ACC ECU 30 or the like as accelerator pedal signals.

The brake pedal sensor 13 is a sensor that detects the amount a brake pedal 13a is depressed. The brake pedal sensor 13 transmits the detected amount of depression to the ACC ECU 30 or the like as brake pedal signals.

The ACC switch 14 is a switch needed to perform operations of turning the ACC system 1 on (activation) and off (halt), or the like. The ACC switch 14 transmits information of operations performed by driver to the ACC ECU 30 as ACC switch signals.

The engine control ECU 20 is a control device needed to control an engine (and, further, driving force). In the engine control ECU 20, a target acceleration is set based on accelerator operations or the like by the driver. In addition, in the engine control ECU 20, target opening degrees of throttle valves necessary to achieve the target acceleration are set, and the target opening degrees are transmitted to a throttle actuator (not shown) as target throttle opening degree signals. Particularly, the engine control ECU 20 transmits the target throttle opening degree signals for achieving the target acceleration shown in engine control signals to the throttle actuator when receiving the engine control signals from the ACC ECU 30.

The throttle actuator is an actuator that adjusts the opening degrees of the throttle valve (not shown). In the throttle actuator, operations are performed in accordance with the target throttle opening degree signals from the engine control ECU 20, and the opening degrees of throttle valves are adjusted. When the target throttle opening degrees are achieved, a vehicle reaches the target acceleration set in the engine control ECU 20 and then reaches the target vehicle speed.

The brake control ECU 21 is a control device needed to control each brake (and, further, braking power). In the brake control ECU 21, a target deceleration is set based on brake operations or the like by the driver. In addition, in the brake control ECU 21, the brake oil pressure of the wheel cylinder (not shown) in each wheel which is necessary to achieve the target deceleration is set, and the brake oil pressures are transmitted to a brake actuator (not shown) as target oil pressure signals. Particularly, the brake control ECU 21 transmits the target oil pressure signals for achieving the target deceleration shown in the brake control signals to the brake actuator when receiving the brake control signals from the ACC ECU 30.

The brake actuator is an actuator needed to adjust the brake oil pressure of the wheel cylinder of each wheel. In the brake actuator, operations are performed in accordance with the target oil pressure signals from the brake control ECU 21, and the brake oil pressures of the wheel cylinder are adjusted. When the target oil pressures are achieved, vehicles come to reach the target deceleration set in the brake control ECU 21 and then reach the target vehicle speeds.

The ACC ECU 30 is an electronic control unit composed of a Central Processing Unit (CPU), a Read Only Memory (ROM), a Random Access Memory (RAM), or the like, and is used to perform the integrated control of the ACC system 1. Based on the ACC switch signals from the ACC switch 14, the ACC ECU 30 activates the ACC system 1 when a driver turns the ACC switch 14 on, and halts the ACC system 1 when the driver turns the ACC switch 14 off during the operation of the ACC system 1.

While the ACC system 1 is in operation, the ACC ECU 30 receives a variety of signals from a variety of sensors 10, 11, 12, and 13, and performs a leading vehicle presence determination control, a following control of the leading vehicle, a constant speed control, a setting control, or the like. That is, the ACC ECU 30 includes a leading vehicle presence determination control section 31 that performs leading vehicle presence determination controls, such as determination of the presence of the leading vehicle or the like, a travel control section 33 that selectively performs the following control of the leading vehicle and the constant speed control, a setting storage section 35 that stores setting information necessary for the following control of the leading vehicle and the constant speed control, and a setting control section 34 that performs a recording treatment or the like of the setting information stored in the setting storage section 35. The leading vehicle presence determination control section 31, the travel control section 33, the setting control section 34, and the setting storage section 35 are components realized in a software manner by the cooperative operation of the hardware of the ACC ECU 30, such as the CPU, the RAM, the ROM, or the like, in accordance with predetermined programs.

The leading vehicle presence determination control by the leading vehicle presence determination control section 31 will be described. The leading vehicle presence determination control section 31 determines the presence of a vehicle traveling in front of a host vehicle (the leading vehicle) based on radar signals from the milliwave radar 10 at a certain time interval. At this time, the traveling direction of the host vehicle is estimated from the steering angle, the yaw rate, or the like, and the presence of a leading vehicle is determined in consideration of the traveling direction of the host vehicle. When a vehicle is present in front of the host vehicle, the leading vehicle presence determination control section 31 calculates inter-vehicle time gaps with the leading vehicle at a certain time interval from the speeds of the host vehicle detected by the vehicle speed sensor 11 and the inter-vehicle distances from the leading vehicle detected in the radar signals from the milliwave radar 10.

The travel control by the travel control section 33 will be described. In the travel control section 33, target accelerations and decelerations are set, and control signals are transmitted to the engine control ECU 20 and the brake control ECU 21 based on the target accelerations or the target decelerations. Here, the target accelerations and decelerations are expressed as plus and minus values, and the plus values indicate acceleration controls (driving force controls) according to the target accelerations, and the minus values indicate deceleration controls (braking power controls) according to the target decelerations.

The following control of the leading vehicle by the travel control section 33 will be described. When a vehicle is present in front of a host vehicle, the travel control section 33 reads inter-vehicle time gap setting from the setting storage section 35 at a certain time interval and uses the inter-vehicle time gap setting as the target inter-vehicle time gap. In addition, the travel control section 33 sets target accelerations and decelerations necessary to make the inter-vehicle time gaps with the leading vehicle become the target inter-vehicle time gap at a certain time interval based on the differences between the inter-vehicle time gaps with the leading vehicle and the target inter-vehicle time gap. When the target acceleration and deceleration is a plus value, the travel control section 33 sets a target acceleration and transmits the target acceleration to the engine control ECU 20 as an engine control signal. When the target acceleration and deceleration is a minus value, the travel control section 33 sets a target deceleration and transmits the target deceleration to the brake control ECU 21 as a brake control signal.

As described above, the inter-vehicle time gap setting showing the target inter-vehicle time gap in the following control of the leading vehicle are stored in the setting storage section 35. Although described in detail below, the inter-vehicle time gap setting is automatically updated in response to operation of the brake pedal 13a by the driver under predetermined conditions and are newly recorded in the setting storage section 35. The inter-vehicle time gap setting immediately after the activation of the ACC system 1 may be, for example, set by the driver using a function included in the ACC switch 14 or may be the inter-vehicle time gap when the ACC system 1 is activated.

The constant speed control by the travel control section 33 will be described. When no vehicle is present in front of the host vehicle, the travel control section 33 scans the vehicle speed setting from the setting storage section 35 at a certain time interval, and uses the vehicle speed setting as the target vehicle speed. In addition, the travel control section 33 sets target accelerations and decelerations necessary to make the vehicle speed of the host vehicle become the target vehicle speed based on the differences between the vehicle speed of the host vehicle and the target vehicle speed. When the target acceleration and deceleration is a plus value, the travel control section 33 sets a target acceleration and transmits the target acceleration to the engine control ECU 20 as an engine control signal. When the target acceleration and deceleration is a minus value, the travel control section 33 sets a target deceleration and transmits the target deceleration to the brake control ECU 21 as a brake control signal.

As described above, the vehicle speed setting showing the target vehicle speed in the constant speed control are stored in the setting storage section 35. Although described in detail below, the vehicle speed setting is automatically updated in response to operation of the brake pedal 13a by the driver under predetermined conditions and are newly recorded in the setting storage section 35. The vehicle speed setting immediately after the activation of the ACC system 1 may be, for example, set by the driver using a function included in the ACC switch 14 or may be the vehicle speed of the host vehicle when the ACC system 1 is activated.

Subsequently, while the ACC system 1 is in operation, the update control of the inter-vehicle time gap setting and the update control of the vehicle speed setting performed by the setting control section 34 will be described.

In the ACC system 1, the inter-vehicle time gap setting and the vehicle speed setting are updated in response to operation of the brake pedal 13a by the driver. In addition, which of the setting information of the inter-vehicle time gap setting and the vehicle speed setting are to be updated is selected based on the deceleration of the leading vehicle when the brake pedal is operated.

That is, herein, when the brake pedal 13a is operated during the following control of the leading vehicle, in a case in which the maximum deceleration of the leading vehicle exceeds the predetermined threshold value A during the operation of the brake pedal, the setting control section 34 performs an update with the vehicle speed of the host vehicle when the operation of the brake pedal ends as a new vehicle speed setting, and, in a case in which the maximum deceleration of the leading vehicle does not exceed the predetermined threshold value A, the setting control section 34 performs an update with the inter-vehicle time gap when the operation of the brake pedal ends as a new inter-vehicle time gap setting. Hereinafter, specific treatments by the setting control section 34 will be described with reference to FIG. 2.

Figure 2:
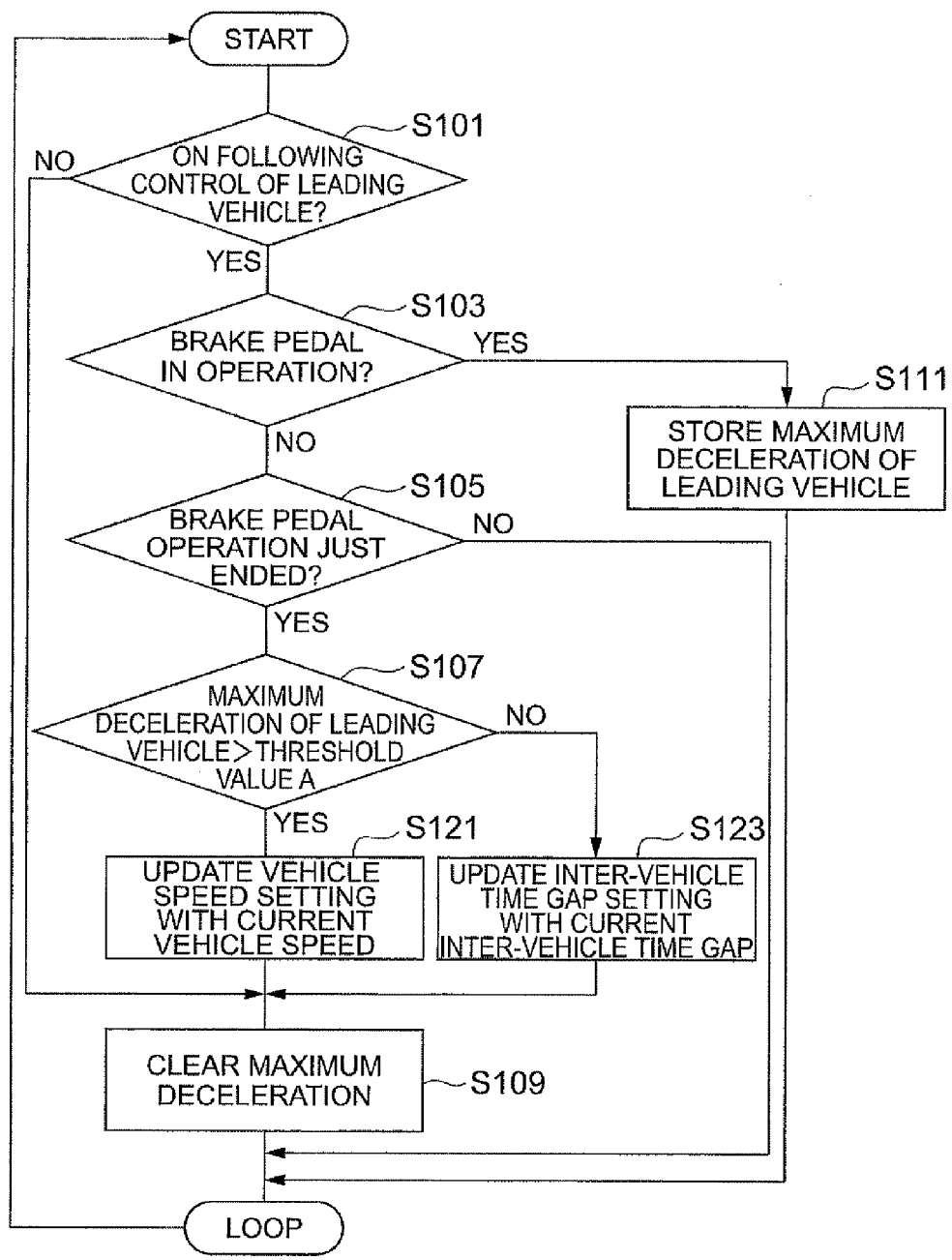
FIG. 2 is a flowchart showing the control for updating the vehicle speed setting and inter-vehicle time gap setting in the ACC system of a first embodiment.

While the ACC system 1 is in operation, as shown in FIG. 2, when the following control of the leading vehicle is performed by the travel control section 33 ('Yes' in S101), no treatment is performed until operation of the brake pedal 13a is detected as 'ON' ('No' in S103 and 'No' in S105). When operation of the brake pedal 13a is detected as 'ON' during the following control of the leading vehicle ('Yes' in S103), the deceleration of the leading vehicle is obtained. In addition, when the deceleration obtained exceeds the maximum deceleration temporarily stored in the RAM of the ACC ECU 30, the obtained deceleration is newly stored in the RAM as a new maximum deceleration (S111). Meanwhile, while operation of the brake pedal 13a stays 'ON', since the treatment S111 is repeated via S101 and S103, the maximum deceleration of the leading vehicle during the operation of the brake pedal 13a (from the operation of the brake pedal 13a detected as 'ON' to the operation detected as 'OFF') is stored in the RAM immediately after the operation of the brake pedal 13a is finally detected as 'OFF'.

Meanwhile, the 'ON/OFF' state of the operation of the brake pedal 13a by the driver can be detected with the brake pedal sensor 13. In addition, the deceleration of the leading vehicle in the treatment S111 can be obtained from a calculation based on, for example, the change in the inter-vehicle distance obtained by the milliwave radar 10 and the change in the vehicle speed of the host vehicle obtained by the vehicle speed sensor 11. In addition, the deceleration of the leading vehicle may be obtained by other methods, such as a method in which the host vehicle obtains values measured by the deceleration sensor of the leading vehicle through inter-vehicle communications, or the like.

Then, immediately after the operation of the brake pedal 13a is detected as 'OFF' ('No' in S103 and 'Yes' in S105), the maximum deceleration of the leading vehicle stored in the RAM and the predetermined threshold value A are compared (S107). The threshold value A is predetermined by the designer of the ACC system 1 based on the desired design concept and is stored in advance in the ROM of the ACC ECU 30. For example, the threshold value A may be 0.15 G. In the treatment S107, when the maximum deceleration of the leading vehicle exceeds the threshold value A ('Yes' in S107), the setting control section 34 obtains the current vehicle speed of the host vehicle detected by the vehicle speed sensor 11 and newly stores the current vehicle speed of the host vehicle in the setting storage section 35 as a new vehicle speed setting (S121; update of vehicle speed setting). In S121, the inter-vehicle time gap setting is not updated. On the other hand, when the maximum deceleration of the leading vehicle does not exceed the threshold value A ('No' in S107), the setting control section 34 obtains the current inter-vehicle time gap calculated by the leading vehicle presence determination control section 31 and newly stores the current inter-vehicle time gap in the setting storage section 35 as a new inter-vehicle time gap setting (S123; update of inter-vehicle time gap setting). In S123, the vehicle speed setting is not updated.

Substantially, the maximum deceleration stored in the RAM of the ACC ECU 30 is cleared (for example, a treatment in which the maximum deceleration becomes zero) (S109).

The above series of treatments are repeated while the ACC system 1 is in operation.

Subsequently, the actions and effects of the ACC system 1 that performs the above treatments will be described.

The case in which the treatment S121 is performed corresponds to a case in which the leading vehicle decelerates at a deceleration exceeding the threshold value A while operation of the brake pedal 13a is performed in the host vehicle. As such, when the host vehicle is decelerated by operation of the brake pedal 13a in a state in which the leading vehicle abruptly decelerates, it can be considered that the driver of the host vehicle depresses the brake pedal 13a with a desire to reduce the vehicle speed of the host vehicle, for example, to avoid potential collision with the leading vehicle, and, at this time, it can be considered that the driver does not particularly desires that the inter-vehicle time gap with the leading vehicle be not narrowed. Here, if updating of the inter-vehicle time gap setting is attempted with the current inter-vehicle time gap, the inter-vehicle time gap setting will be changed to be shorter in future following control of the leading vehicle, which is not desired by the driver. Therefore, in the treatment S121, only the vehicle speed setting is updated, and the inter-vehicle time gap setting remains as it is, thereby achieving settings in compliance with an intention of the driver.

In addition, the case in which the treatment S123 is performed corresponds to a case in which the leading vehicle does not decelerate at a deceleration exceeding the threshold value A while operation of the brake pedal 13a is performed in the host vehicle. As such, when the host vehicle is decelerated by operation of the brake pedal 13a in a state in which the leading vehicle does not abruptly decelerate, it can be considered that the driver of the host vehicle depresses the brake pedal 13a with a desire to broaden the inter-vehicle time gap with the leading vehicle and continue to follow the leading vehicle in the broaden inter-vehicle time gap thereafter. In addition, at this time, it can be considered that the driver does not particularly desire the reduction of the vehicle speed of the host vehicle. Here, if updating of the inter-vehicle time gap setting is not attempted with the current inter-vehicle time gap, the broadened inter-vehicle time gap setting will be returned to the original setting again after the operation of the brake pedal ends, which is not desired by the driver. In addition, here, if updating of the vehicle speed setting is attempted with the current vehicle speed, the upper limit of the vehicle speed of the host vehicle for following the leading vehicle (the vehicle speed setting) is reduced, and thus there are cases in which the host vehicle cannot follow the leading vehicle, which is not desired by the driver. Therefore, in the treatment S123, only the inter-vehicle time gap setting is updated, and the vehicle speed setting remains as it is, thereby achieving settings in compliance with an intention of a driver.

In addition, in this case, the driver can update the inter-vehicle time gap setting with the inter-vehicle time gap when the driver releases the brake pedal by depressing the brake pedal 13a so as to broaden the inter-vehicle time gap with the leading vehicle and releasing the brake pedal 13a when the inter-vehicle time gap becomes the desired gap. As such, the driver can perform intuitive operations for the inter-vehicle time gap setting that is one of the setting items of ACC.

As described above, according to the ACC system 1, it is possible to realize the settings of inter-vehicle time gaps and vehicle speeds which reflect an intention of the driver by pedal operations.

Second Embodiment

Subsequently, as a second embodiment of the vehicle travel control device according to the invention, an ACC system 201 will be described. As shown in FIG. 1, since the ACC system 201 has the same configuration as the ACC system 1, the configuration of the ACC system 201 will not be described in detail. In the ACC system 201, the update control of the inter-vehicle time gap setting and the update control of the vehicle speed setting performed by the setting control section 34 are performed in a different manner from the ACC system 1.

In the ACC system 201, which of the setting information of the inter-vehicle time gap setting and the vehicle speed setting are to be updated is selected based on whether or not the inter-vehicle distance of the host vehicle is narrowed by operation of the brake pedal. Specifically, in the ACC system 201, when the brake pedal 13a is operated during the following control of the leading vehicle, in a case in which the inter-vehicle distance from the leading vehicle at the end of the operation of the brake pedal becomes shorter than the inter-vehicle distance at the start of the operation of the brake pedal, the setting control section 34 performs an update with the vehicle speed of the host vehicle when the operation of the brake pedal ends as a new vehicle speed setting, and, in a case in which the inter-vehicle distance from the leading vehicle at the end of the operation of the brake pedal does not become shorter than the inter-vehicle distance at the start of the operation of the brake pedal, the setting control section 34 performs an update with the inter-vehicle time gap when the operation of the brake pedal ends as a new inter-vehicle time gap setting. Hereinafter, specific treatments by the setting control section 34 will be described with reference to FIG. 3.

Figure 3:
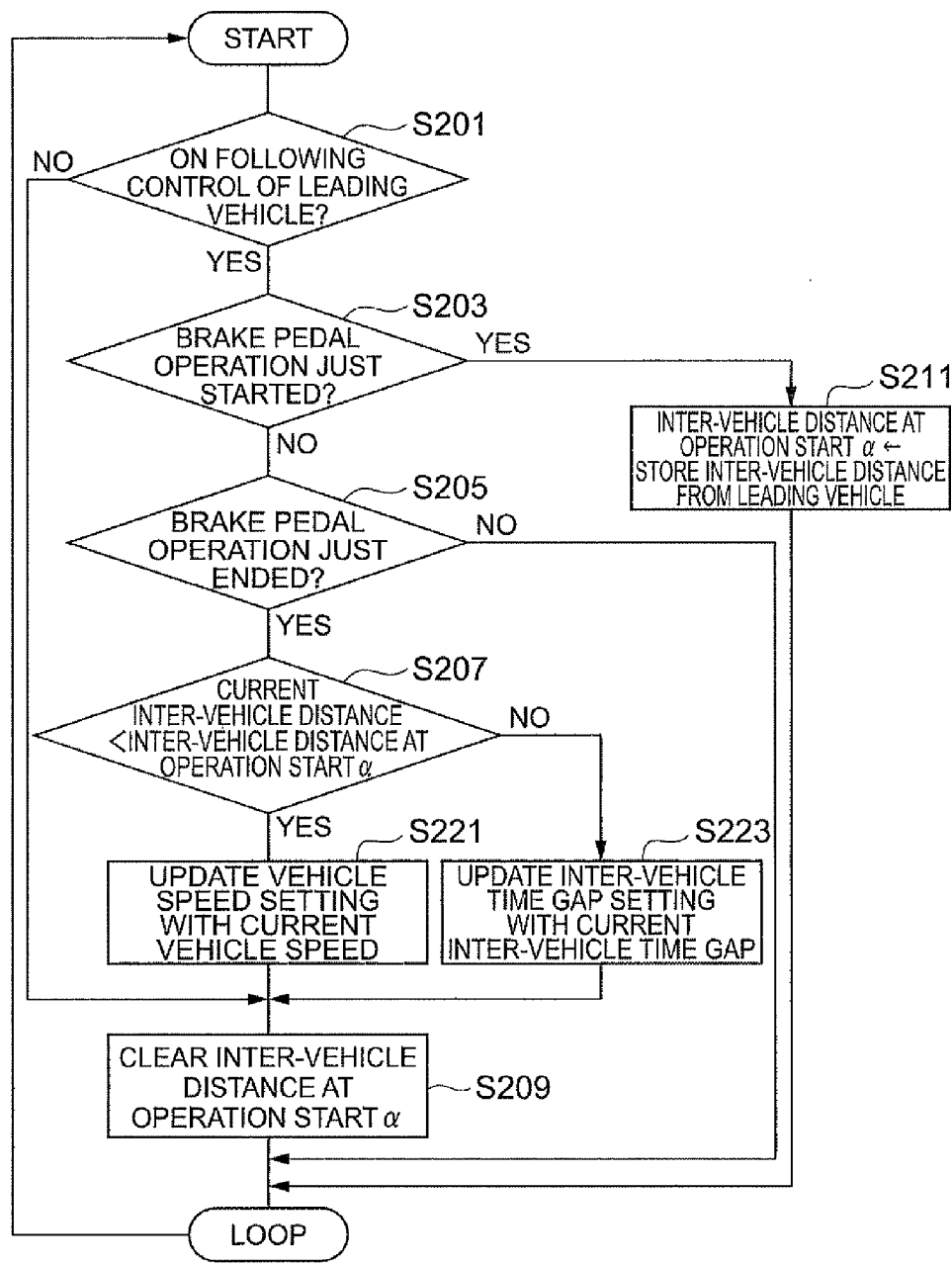
FIG. 3 is a flowchart showing the control for updating the vehicle speed setting and inter-vehicle time gap setting in the ACC system of a second embodiment.

While the ACC system 201 is in operation, as shown in FIG. 3, when the following control of the leading vehicle is performed by the travel control section 33 ('Yes' in S201), no treatment is performed until an operation of the brake pedal 13a is detected as 'ON' ('No' in S203 and 'No' in S205). Immediately after operation of the brake pedal 13a is detected as 'ON' during the following control of the leading vehicle ('Yes' in S203), the current inter-vehicle distance from the leading vehicle is obtained from the leading vehicle presence determination control section 31 and is temporarily stored in the RAM of the ACC ECU 30 as "the inter-vehicle distance α at the start of the operation" (S211). Meanwhile, since the inter-vehicle distance α at the start of the operation is obtained immediately after the operation of the brake pedal 13a is detected as 'ON', it can also be considered that α is the inter-vehicle distance from the leading vehicle before the operation of the brake pedal 13a. Immediately after the operation of the brake pedal 13a is detected as 'ON', the treatment S211 is performed only once, and, after that, no treatment is performed until the operation of the brake pedal 13a is detected as 'OFF' ('No' in S203 and 'No' in S205).

After that, immediately after the operation of the brake pedal 13a is detected as 'OFF' ('Yes' in S205), again, the current inter-vehicle distance from the leading vehicle is obtained from the leading vehicle presence deteutiination control section 31, and the current inter-vehicle distance (hereinafter referred to as "the inter-vehicle distance at the end of the operation") and the inter-vehicle distance α at the start of the operation stored in the RAM are compared (S207). In the treatment S207, when the inter-vehicle distance at the end of the operation is smaller than the inter-vehicle distance α at the start of the operation ('Yes' in S207), the vehicle speed setting is updated in the same manner as the treatment S221 (refer to FIG. 2). In S221, the inter-vehicle time gap setting is not updated. On the other hand, in the treatment S207, when the inter-vehicle distance at the end of the operation is not smaller than the inter-vehicle distance α at the start of the operation ('No' in S207), the inter-vehicle distance setting are updated in the same manner as the treatment S223 (refer to FIG. 2) (S223). In S123, the vehicle speed setting is not updated.

After that, the inter-vehicle distance α at the start of the operation stored in the RAM of the ACC ECU 30 is cleared (for example, a treatment in which α becomes zero) (S209).

The above series of treatments are repeated while the ACC system 201 is in operation.

Subsequently, the actions and effects of the ACC system 201 that performs the above treatments will be described.

The case in which the treatment S221 is performed corresponds to a case in which the inter-vehicle distance from the leading vehicle after the operation of the brake pedal 13a ends becomes narrower than the inter-vehicle distance before the operation. In this case, it can be considered that the leading vehicle decelerates more than the host vehicle. That is, similarly to the case of the treatment S121 in the above ACC system 1, it can be considered that the leading vehicle abruptly decelerates. As such, in the treatment S221, when the host vehicle is decelerated by operation of the brake pedal 13a in a state in which the leading vehicle abruptly decelerates, similarly to the above treatment S121, only the vehicle speed setting is updated, and the inter-vehicle time gap setting remains as it is. Therefore, according to the ACC system 201, similarly to the above ACC system 1, it is possible to achieve the vehicle speed setting and the inter-vehicle time gap setting in compliance with an intention of the driver.

In addition, the case in which the treatment S223 is performed corresponds to a case in which the inter-vehicle distance from the leading vehicle when the operation of the brake pedal 13a ends does not become narrower than the inter-vehicle distance before the operation. In this case, it can be considered that the leading vehicle does not decelerate more than the host vehicle. As such, when the host vehicle is decelerated by operation of the brake pedal 13a in a state in which the leading vehicle does not abruptly decelerate, as described above, it can be considered that the driver of the host vehicle depresses the brake pedal 13a with a desire to broaden the inter-vehicle time gap with the leading vehicle and continue to follow the leading vehicle with the broadened inter-vehicle time gap thereafter. Therefore, in the treatment S223, similarly to the above treatment S123, only the inter-vehicle time gap setting is updated, and the vehicle speed setting remains as it is. Therefore, according to the ACC system 201, similarly to the above ACC system 1, it is possible to achieve the vehicle speed setting and the inter-vehicle time gap setting in compliance with an intention of the driver. In addition, similarly to the above ACC system 1, the driver can perform intuitive operations for the inter-vehicle time gap setting that is one of the setting items of ACC.

As described above, according to the ACC system 201, it is possible to realize the settings of inter-vehicle time gaps and vehicle speeds which reflect an intention of the driver by pedal operations.

Meanwhile, in the ACC system 201, setting information to be updated are selected according to the relationship between the inter-vehicle distance at the end of the operation and the inter-vehicle distance at the start of the operation (S207), but, instead, setting information to be updated may be selected according to the relative relationship between the inter-vehicle time gap at the end of the operation and the inter-vehicle time gap at the start of the operation.

Third Embodiment

Subsequently, as a third embodiment of the vehicle travel control device according to the invention, an ACC system 301 will be described. As shown in FIG. 1, since the ACC system 301 has the same configuration as the ACC system 1, the configuration of the ACC system 301 will not be described in detail. In the ACC system 301, the update control of the inter-vehicle time gap setting and the update control of the vehicle speed setting performed by the setting control section 34 are performed in a different manner from the ACC system 1.

In the ACC system 301, which of the setting information of the inter-vehicle time gap setting and the vehicle speed setting are to be updated is selected based on the amount by which the vehicle speed of the host vehicle is reduced before and after operation of the brake pedal. Specifically, when the brake pedal 13a is operated during the following control of the leading vehicle, in a case in which the reduced amount of the vehicle speed of the host vehicle obtained by subtracting the vehicle speed of the host vehicle at the start of the operation of the brake pedal from the vehicle speed of the host vehicle at the end of the operation of the brake pedal (hereinafter referred to as 'the reduced amount of the vehicle speed of the host vehicle') is larger than the predetermined threshold value B, the setting control section 34 performs an update with the vehicle speed of the host vehicle when the operation of the brake pedal ends as a new vehicle speed setting, and, in a case in which the above reduced amount of the vehicle speed of the host vehicle is not larger than the threshold value B, the setting control section 34 performs an update with the inter-vehicle time gap when the operation of the brake pedal ends as a new inter-vehicle time gap setting. Hereinafter, specific treatments by the setting control section 34 will be described with reference to FIG. 4.

Figure 4:
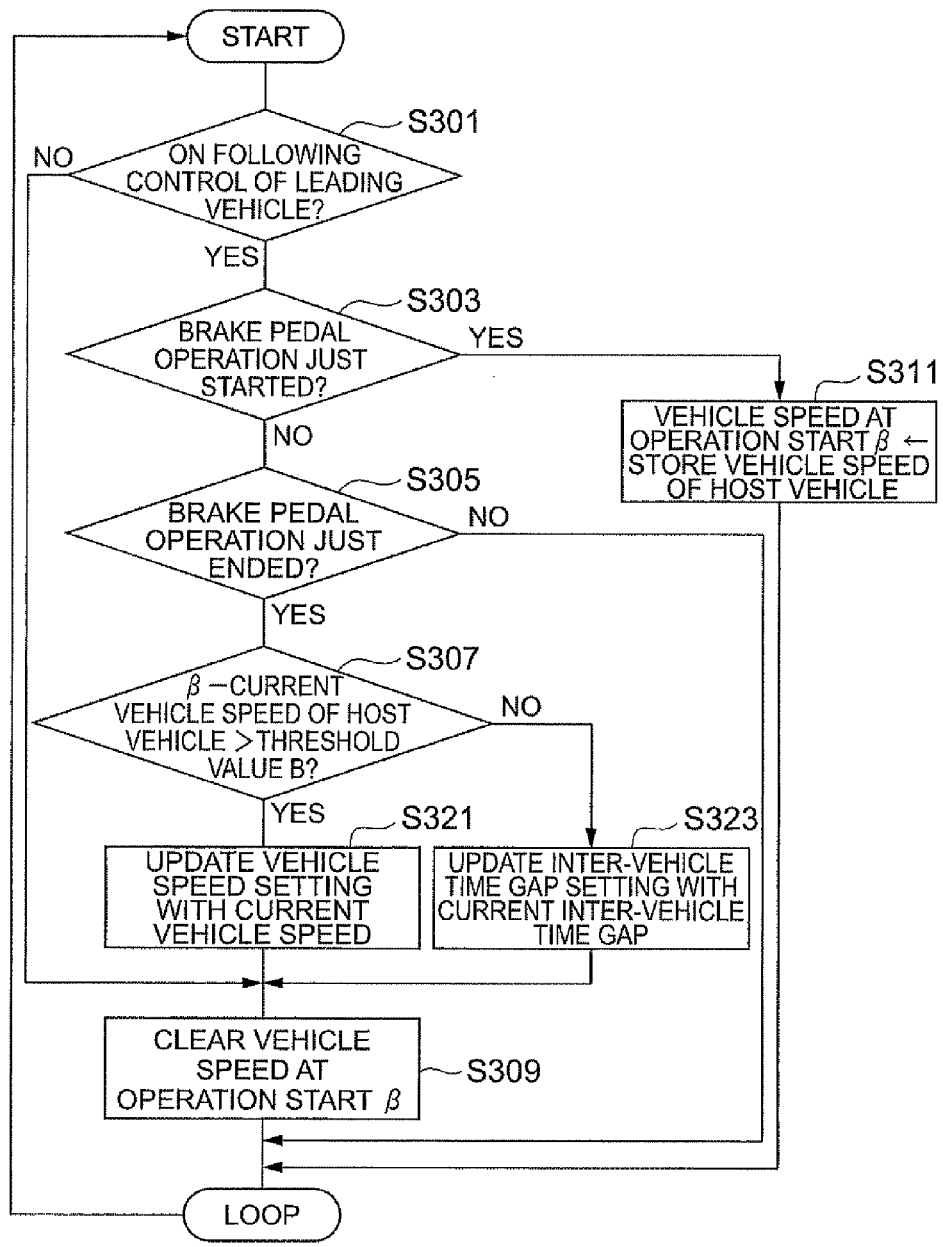
FIG. 4 is a flowchart showing the control for updating the vehicle speed setting and inter-vehicle time gap setting in the ACC system of a third embodiment.

While the ACC system 301 is in operation, as shown in FIG. 4, when the following control of the leading vehicle is performed by the travel control section 33 ('Yes' in S301), no treatment is performed until operation of the brake pedal 13a is detected as 'ON' ('No' in S303 and 'No' in S305). When operation of the brake pedal 13a is detected as 'ON' during the following control of the leading vehicle ('Yes' in S303), the current vehicle speed of the host vehicle is obtained from the vehicle speed sensor 11 and is temporarily stored in the RAM of the ACC ECU 30 as "the vehicle speed β at the start of the operation" (S311). Meanwhile, since the vehicle speed β at the start of the operation is obtained immediately after the operation of the brake pedal 13a is detected as 'ON', it can also be considered that β is the vehicle speed of the host vehicle before the operation of the brake pedal 13a. Immediately after the operation of the brake pedal 13a is detected as 'ON', the treatment S311 is performed only once, and, after that, no treatment is performed until the operation of the brake pedal 13a is detected as 'OFF' ('No' in S303 and 'No' in S305).

After that, immediately after the operation of the brake pedal 13a is detected as 'OFF' ('Yes' in S305), again, the current vehicle speed of the host vehicle is obtained from the vehicle speed sensor 11. In addition, the reduced amount of the vehicle speed of the host vehicle due to the operation of the brake pedal is calculated based on the vehicle speed of the host vehicle (hereinafter referred to as "the vehicle speed at the end of the operation") and the vehicle speed β at the start of the operation stored in the RAM. That is, the reduced amount of the vehicle speed of the host vehicle is calculated as a value obtained by subtracting the vehicle speed at the end of the operation from the vehicle speed β at the start of the operation. In addition, the reduced amount of the vehicle speed of the host vehicle and the predetermined threshold value B are compared (S307). The threshold value B is predetermined by the designer of the ACC system 301 based on the desired design concept and is stored in advance in the ROM of the ACC ECU 30. For example, the threshold value B is 20 km/h.

In the treatment S307, when the reduced amount of the vehicle speed of the host vehicle is larger than the threshold value B ('Yes' in S307), the vehicle speed setting are updated in the same manner as the treatment S121 (refer to FIG. 2) (S321). In S321, the inter-vehicle time gap setting is not updated. On the other hand, in the treatment S307, when the reduced amount of the vehicle speed of the host vehicle is not larger than the threshold value B ('No' in S307), the inter-vehicle time gap setting are updated in the same manner as the treatment S123 (refer to FIG. 2) (S323). In S323, the vehicle speed setting is not updated.

After that, the vehicle speed β at the start of the operation stored in the RAM of the ACC ECU 30 is cleared (for example, a treatment in which β becomes zero) (S309).

The above series of treatments are repeated while the ACC system 301 is in operation.

Subsequently, the actions and effects of the ACC system 301 that performs the above treatments will be described.

The case in which the treatment S321 is performed corresponds to a case in which the vehicle speed of the host vehicle after the operation of the brake pedal 13a is significantly lowered in comparison to the vehicle speed of the host vehicle before the operation. For example, a case in which the host vehicle abruptly decelerates to avoid a certain risk belongs to the above case. As such, when the host vehicle is abruptly decelerated through an operation of the brake pedal 13a, it can be considered that the driver of the host vehicle depresses the brake pedal 13a with a desire to reduce the current vehicle speed. At this time, it can be considered that the driver does not particularly desire to broaden the inter-vehicle time gap with the leading vehicle. Here, if updating of the inter-vehicle time gap setting is attempted with the current inter-vehicle time gap, the inter-vehicle time gap setting will be changed to be longer in future following control of the leading vehicle, which is not desired by the driver. Therefore, in the treatment S321, only the vehicle speed setting is updated, and the inter-vehicle time gap setting remains as it is, thereby achieving settings in compliance with an intention of a driver.

In addition, the case in which the treatment S323 is performed corresponds to a case in which the vehicle speed of the host vehicle after the operation of the brake pedal 13a is not significantly lowered in comparison to the vehicle speed of the host vehicle before the operation. As such, when the host vehicle is slightly decelerated by operation of the brake pedal 13a, it can be considered that the driver of the host vehicle depresses the brake pedal 13a with a desire to broaden the inter-vehicle time gap with the leading vehicle and continue to follow the leading vehicle with the broadened inter-vehicle time gap thereafter. Therefore, in the treatment S323, similarly to the above treatment S123, only the inter-vehicle time gap setting is updated, and the vehicle speed setting remains as it is. Therefore, according to the ACC system 301, similarly to the above ACC system 1, it is possible to achieve the vehicle speed setting and the inter-vehicle time gap setting in compliance with an intention of the driver. In addition, similarly to the above ACC system 1, the driver can perform intuitive operations for the inter-vehicle time gap setting that is one of the setting items of ACC.

As described above, according to the ACC system 301, it is possible to realize the settings of inter-vehicle time gaps and vehicle speeds which reflect an intention of the driver by pedal operations.

Fourth Embodiment

Subsequently, as a fourth embodiment of the vehicle travel control device according to the invention, an ACC system 401 will be described. As shown in FIG. 1, since the ACC system 401 has the same configuration as the ACC system 1, the configuration of the ACC system 401 will not be described in detail. In the ACC system 401, the update control of the inter-vehicle time gap setting and the update control of the vehicle speed setting performed by the setting control section 34 are performed in a different manner from the ACC system 1.

In the ACC system 401, which of the setting information of the inter-vehicle time gap setting and the vehicle speed setting are to be updated is selected based on the relative speed of the leading vehicle with respect to the host vehicle after operation of the brake pedal (an index showing the relative relationship between the host vehicle and the leading vehicle; vehicle speed difference). Specifically, although the relative speed of the leading vehicle with respect to the host vehicle is almost zero in the following control of the leading vehicle, when the brake pedal 13a is operated during the following control of the leading vehicle, the above relative speed is generated due to the operation. As a result, in a case in which the relative speed of the leading vehicle with respect to the host vehicle when the operation of the brake pedal 13a ends becomes larger than the predetermined threshold value C, the setting control section 34 performs an update with the vehicle speed of the host vehicle when the operation of the brake pedal ends as a new vehicle speed setting, and, in a case in which the relative speed of the leading vehicle does not become larger than the predetermined threshold value C, the setting control section 34 performs an update with the inter-vehicle time gap when the operation of the brake pedal ends as a new inter-vehicle time gap setting. Hereinafter, specific treatments by the setting control section 34 will be described with reference to FIG. 5.

Figure 5:
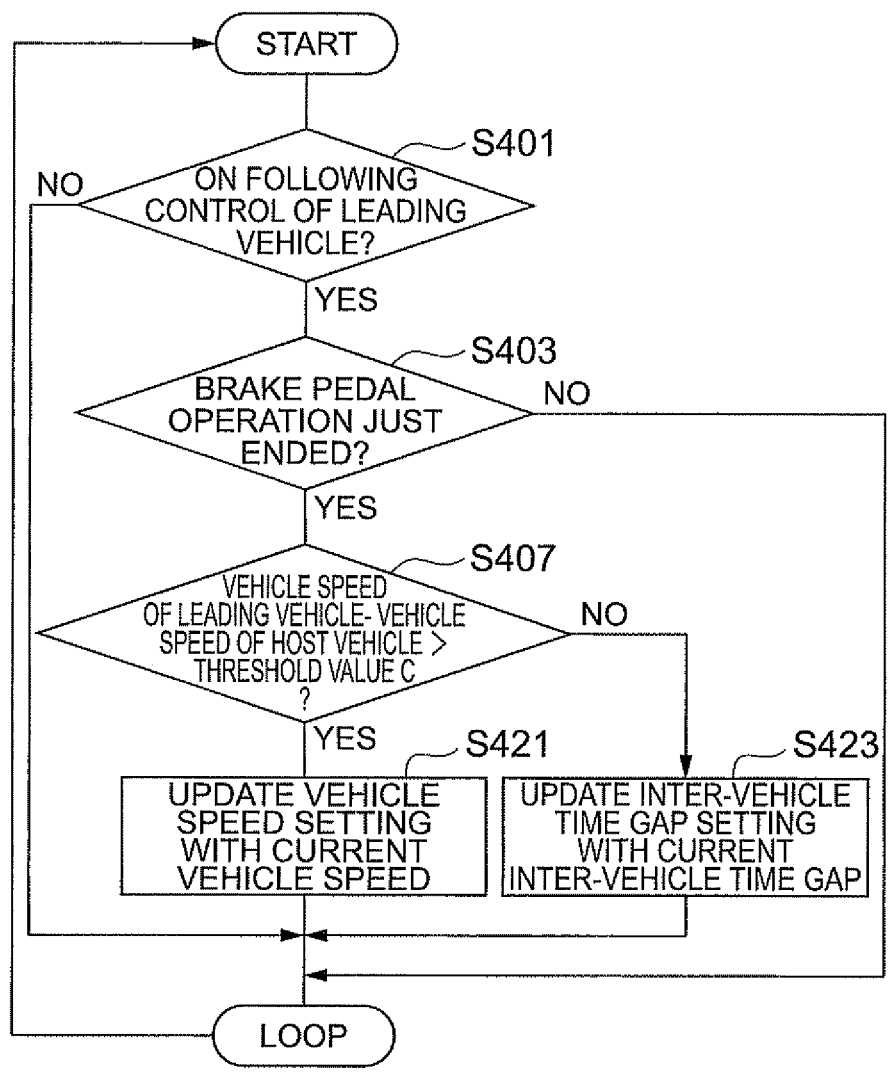
FIG. 5 is a flowchart showing the control for updating the vehicle speed setting and inter-vehicle time gap setting in the ACC system of a fourth embodiment.

While the ACC system 401 is in operation, as shown in FIG. 5, when the following control of the leading vehicle is performed by the travel control section 33 ('Yes' in S401), no treatment is performed until operation of the brake pedal 13a is detected to be switched from 'ON' to 'OFF' ('No' in S403). Immediately after the brake pedal 13a is operated, and then the operation of the brake pedal 13a is detected to be switched from 'ON' to 'OFF' during the following control of the leading vehicle ('Yes' in S403), the current relative speed of the leading vehicle with respect to the host vehicle is obtained. The relative speed can be obtained from, for example, calculation based on the change in the inter-vehicle distance over time obtained by the milliwave radar 10, and is a value obtained by subtracting the vehicle speed of the host vehicle from the vehicle speed of the leading vehicle. In addition, the obtained relative speed of the leading vehicle and the predetermined threshold value C are compared (S407). The threshold value C is predetermined by the designer of the ACC system 401 based on the desired design concept and is stored in advance in the ROM of the ACC ECU 30. For example, the threshold value C is 20 km/h.

In the treatment S407, when the above relative speed of the leading vehicle is larger than the predetermined threshold value C ('Yes' in S407), the vehicle speed setting are updated in the same manner as the treatment S121 (refer to FIG. 2). In S421, the inter-vehicle time gap setting is not updated. On the other hand, in the treatment S407, when the relative speed of the leading vehicle is not larger than the predetermined threshold value C ('No' in S407), the inter-vehicle time gap setting is updated in the same manner as the treatment S123 (refer to FIG. 2) (S423). In S423, the vehicle speed setting is not updated.

The above series of treatments are repeated while the ACC system 401 is in operation.

Subsequently, the actions and effects of the ACC system 401 that performs the above treatments will be described.

Figure 6:
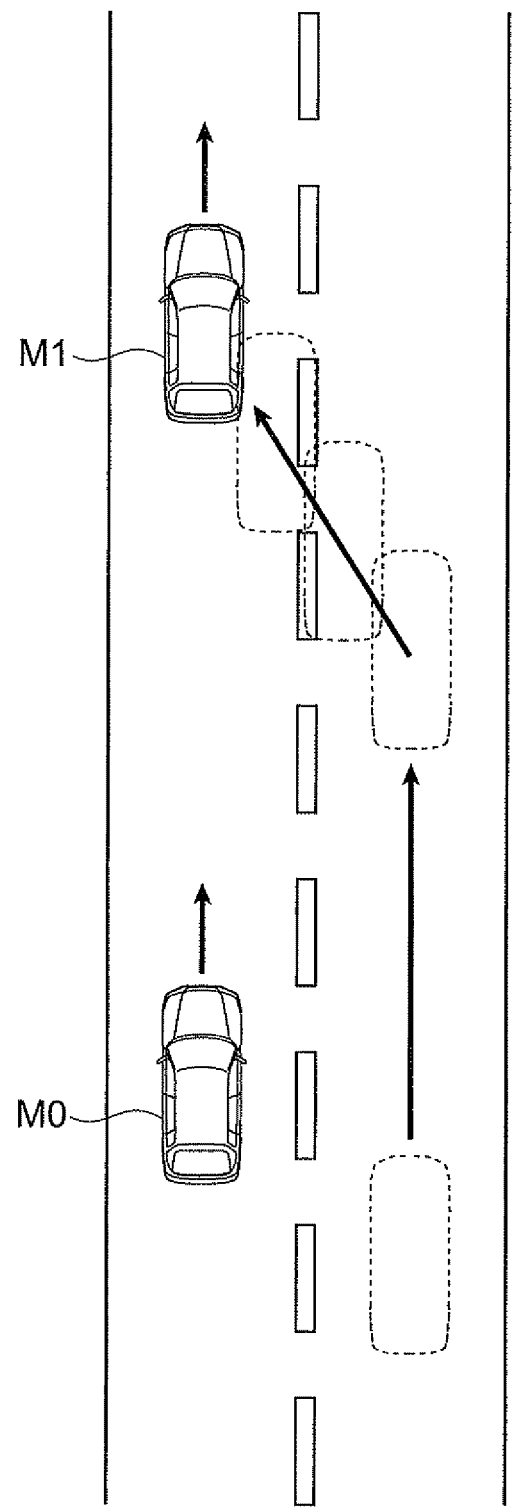
FIG. 6 is a view showing an example where a control for updating the vehicle speed setting is performed in the ACC system of the fourth embodiment.

The case in which the treatment S421 is performed corresponds to a case in which, when the operation of the brake pedal 13a of the host vehicle ends, the vehicle speed of the leading vehicle is larger than the vehicle speed of the host vehicle, and the difference of the vehicle speeds is larger than the threshold value C. For example, as shown in FIG. 6, a case in which a vehicle M1 with a higher speed enters the lane in front of the host vehicle M0, and the vehicle M1 is recognized as the leading vehicle M0 so that the driver of the host vehicle senses danger and depresses the brake pedal 13a belongs to the above case. When the brake pedal 13a of the host vehicle M0 is operated in the above manner, it can be considered that the driver of the host vehicle depresses the brake pedal 13a with a desire to reduce the vehicle speed to avoid danger, and, at this time, it can be considered that the driver does not particularly desire to set the inter-vehicle time gap with the leading vehicle M1. Here, if updating of the inter-vehicle time gap setting is attempted with the current inter-vehicle time gap, in the future, there may be cases in which the following control of the leading vehicle begins with respect to the leading vehicle M1 with a higher vehicle speed, which is not desired by the driver. Therefore, in the treatment S421, only the vehicle speed setting is updated, and the inter-vehicle time gap setting remains as it is, thereby achieving settings in compliance with an intention of a driver.

In addition, the case in which the treatment S423 is performed corresponds to a case in which the difference in the vehicle speeds of the host vehicle and the leading vehicle is not large when the operation of the brake pedal 13a of the host vehicle ends. That is, a case in which a vehicle with a higher speed enters the lane in front of the host vehicle, and the vehicle is recognized as the leading vehicle, and the driver of the host vehicle depresses the brake pedal 13a so that, consequently, the difference in the vehicle speeds of the host vehicle and the leading vehicle becomes small belongs to the above case. In this case, it can be considered that the driver desires the following control of the leading vehicle with the inter-vehicle time gap gained when the operation of the pedal ends. Here, if updating of the vehicle speed setting is attempted with the current vehicle speed, there may be cases in which the upper limit of the vehicle speed of the host vehicle (the vehicle speed setting) for following the leading vehicle is not sufficient so that the host vehicle cannot follow the leading vehicle, which is not desired by the driver. Therefore, in the treatment S423, only the inter-vehicle time gap setting is updated, and the vehicle speed setting remains as it is, thereby achieving settings in compliance with an intention of the driver.

As described above, according to the ACC system 401, it is possible to realize the settings of inter-vehicle time gaps and vehicle speeds which reflect an intention of the driver by pedal operations.

Fifth Embodiment

Subsequently, as a fifth embodiment of the vehicle travel control device according to the invention, an ACC system 501 will be described. As shown in FIG. 1, since the ACC system 501 has the same configuration as the ACC system 1, the configuration of the ACC system 501 will not be described in detail. In the ACC system 501, the update control of the inter-vehicle time gap setting and the update control of the vehicle speed setting performed by the setting control section 34 are performed in a different manner from the ACC system 401.

In the ACC system 501, which of the setting information of the inter-vehicle time gap setting and the vehicle speed setting are to be updated is selected based on the relative speed of the host vehicle with respect to the leading vehicle after operation of the brake pedal (an index showing the relative relationship between the host vehicle and the leading vehicle; vehicle speed difference). Specifically, although the relative speed of the host vehicle with respect to the leading vehicle is almost zero in the first following control of the leading vehicle, when the brake pedal 13a is operated during the following control of the leading vehicle, the above relative speed is generated due to the operation. As a result, in a case in which the relative speed of the host vehicle with respect to the leading vehicle when the operation of the brake pedal 13a ends becomes larger than the predetermined threshold value D, the setting control section 34 performs an update with the vehicle speed of the host vehicle when the operation of the brake pedal ends as a new vehicle speed setting. On the other hand, in a case in which the relative speed of the host vehicle does not become larger than the predetermined threshold value D, the setting control section 34 performs an update with the inter-vehicle time gap when the operation of the brake pedal ends as a new inter-vehicle time gap setting. Hereinafter, specific treatments by the setting control section 34 will be described with reference to FIG. 7.

Figure 7:
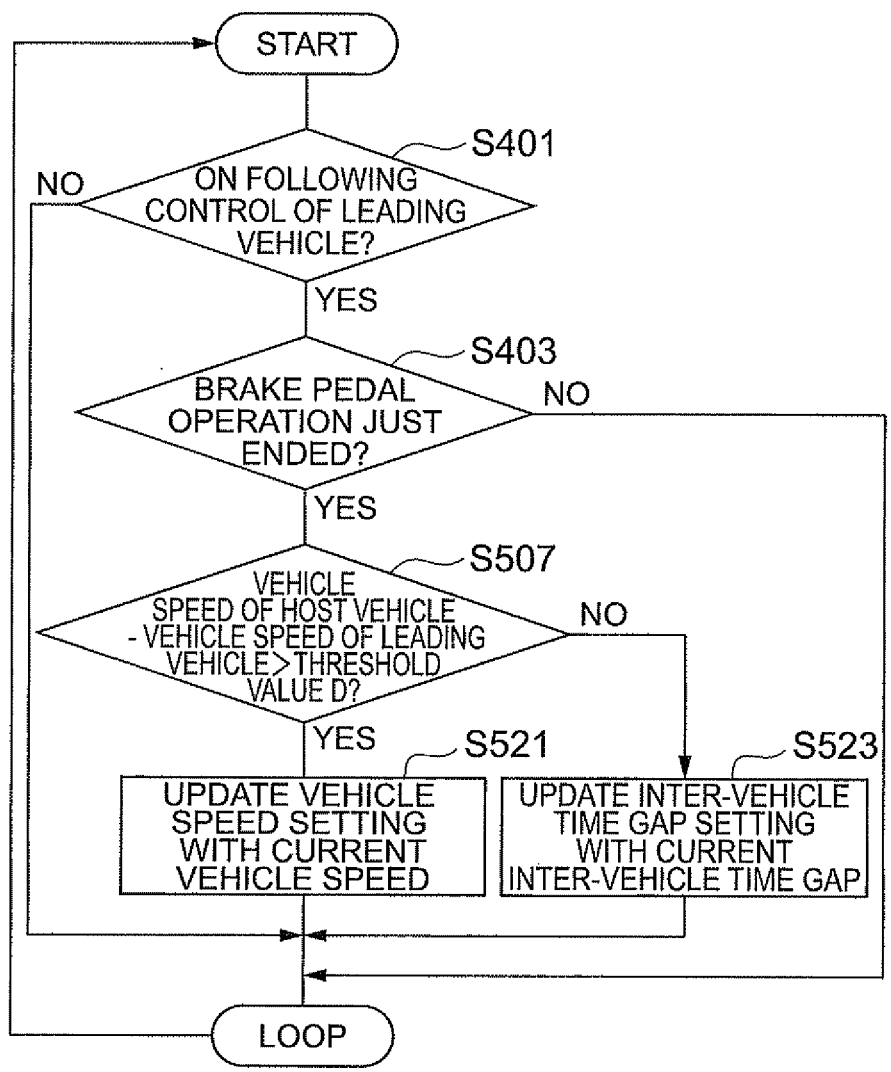
FIG. 7 is a flowchart showing the control of updating the vehicle speed setting and inter-vehicle time gap setting in the ACC system of a fifth embodiment.

As shown in FIG. 7, in the treatment by the ACC system 501, the determination treatment S407 in the treatment by the ACC system 401 (refer to FIG. 5) is replaced with another determination treatment S507.

In the treatment S507, the current relative speed of the host vehicle with respect to the leading vehicle is obtained. The relative speed can be obtained from, for example, calculation based on the change in the inter-vehicle distance from the leading vehicle over time obtained by the milliwave radar 10, and is a value obtained by subtracting the vehicle speed of the leading vehicle from the vehicle speed of the host vehicle. In addition, the obtained relative speed of the host vehicle and the predetermined threshold value D are compared (S507). The threshold value D is predetermined by the designer of the ACC system 501 based on the desired design concept and is stored in advance in the ROM of the ACC ECU 30. For example, the threshold value D is 20 km/h.

In the treatment S507, when the above relative speed of the host vehicle is larger than the predetermined threshold value D ('Yes' in S507), the vehicle speed setting is updated in the same manner as the treatment S421 (refer to FIG. 5) (S521). In S521, the inter-vehicle time gap setting is not updated. On the other hand, in the treatment S507, when the relative speed of the host vehicle is not larger than the predetermined threshold value D ('No' in S507), the inter-vehicle time gap setting is updated in the same manner as the treatment S423 (refer to FIG. 5) (S523). In S523, the vehicle speed setting is not updated. In the treatment of FIG. 7, similar reference numbers are given to treatments similar or equivalent to the treatments in FIG. 5, and no duplicate description will be made.

Subsequently, the actions and effects of the ACC system 501 that performs the above treatments will be described.

Figure 8:
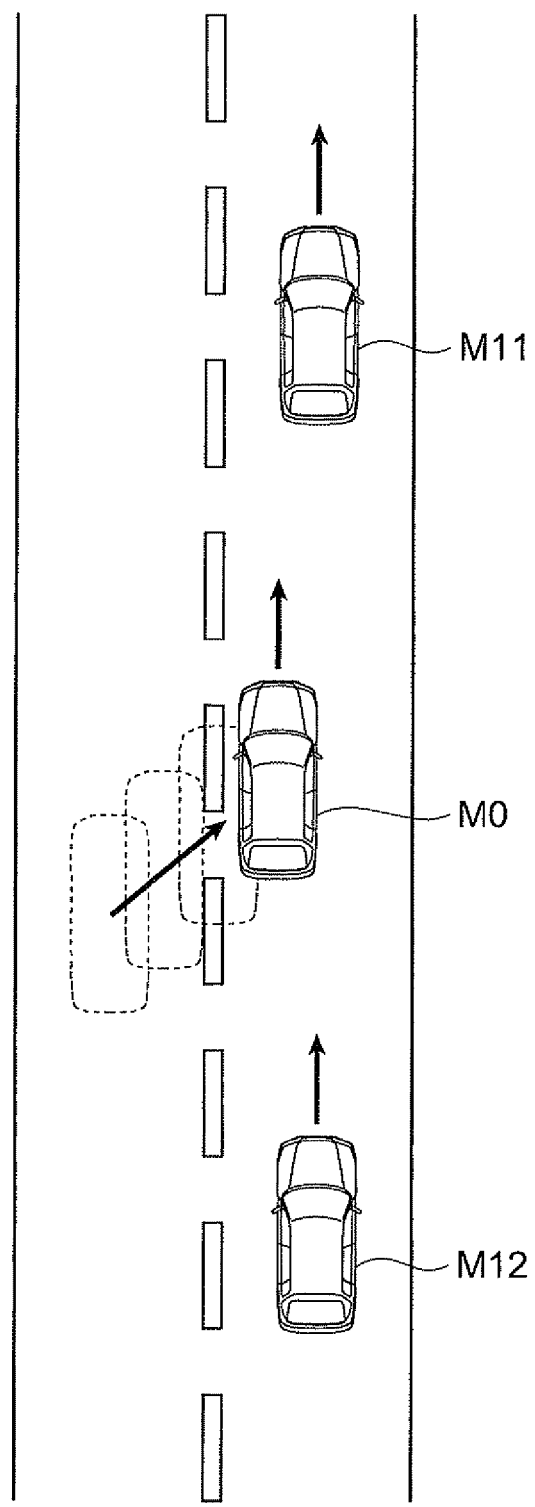
FIG. 8 is a view showing an example where a control for updating the vehicle speed setting is performed in the ACC system of the fifth embodiment.

The case in which the above treatment S521 is performed corresponds to a case in which, when the operation of the brake pedal 13*a* of the host vehicle ends, the vehicle speed of the host vehicle is larger than the vehicle speed of the leading vehicle, and the difference of the vehicle speeds is larger than the threshold value D. For example, as shown in FIG. 8, a case in which, when the host vehicle M0 enters the lane of a group of low speed vehicles M11, M12, . . . , the host vehicle M0 enters at the back of the vehicle M11 that is in the middle of the group, the vehicle M11 is recognized as the leading vehicle of the host vehicle M0 so that the driver of the host vehicle M0 depresses the brake pedal 13*a* while entering the lane of the vehicle M11 from the back belongs to the above case. When the brake pedal 13*a* of the host vehicle is operated in the above manner, it can be considered that the driver of the host vehicle M0 depresses the brake pedal 13*a* with a desire to reduce the vehicle speed in an attempt to match the vehicle speeds of the above group of vehicles M11, M12, . . . , and, at this time, it can be considered that the driver does not particularly desire to set the inter-vehicle time gap with the leading vehicle M11. Therefore, in the treatment S521, only the vehicle speed setting is updated, and the inter-vehicle time gap setting remains as it is, thereby achieving settings in compliance with an intention of the driver.

In addition, the case in which the treatment S523 is performed corresponds to a case in which the difference in the vehicle speeds of the host vehicle and the leading vehicle is not large when the operation of the brake pedal 13*a* of the host vehicle ends. For example, when the host vehicle enters the lane of a group of low speed vehicles, the host vehicle enters the lane of a vehicle in the group from the back, and the vehicle is recognized as the leading vehicle with respect to the host vehicle, and the driver of the host vehicle depresses the brake pedal 13*a* while entering the lane of the vehicle from the back so that, consequently, the difference in the vehicle speeds of the host vehicle and the vehicle becomes small belongs to the above case. In this case, it can be considered that the driver desires the following control of the leading vehicle with the inter-vehicle time gap gained when the operation of the pedal ends. Here, if updating of the vehicle speed setting is attempted with the current vehicle speed, there may be cases in which the upper limit of the vehicle speed of the host vehicle (the vehicle speed setting) for following the leading vehicle is not sufficient so that the host vehicle cannot follow the leading vehicle, which is not desired by the driver. Therefore, in the treatment S523, only the inter-vehicle time gap setting is updated, and the vehicle speed setting remains as it is, thereby achieving settings in compliance with an intention of the driver.

As described above, according to the ACC system 501, it is possible to realize the settings of inter-vehicle time gaps and vehicle speeds which reflect an intention of a driver by pedal operations.

Sixth Embodiment

Subsequently, as a sixth embodiment of the vehicle travel control device according to the invention, an ACC system 601 will be described. As shown in FIG. 1, since the ACC system 601 has the same configuration as the ACC system 1, the configuration of the ACC system 601 will not be described in detail. In the ACC system 601, the update control of the inter-vehicle time gap setting and the update control of the vehicle speed setting performed by the setting control section 34 are performed in a different manner from the ACC system 401.

In the ACC system 601, which of the setting information of the inter-vehicle time gap setting and the vehicle speed setting are to be updated is selected based on the inter-vehicle distance between the host vehicle and the leading vehicle after operation of the brake pedal (an index showing the relative relationship between the host vehicle and the leading vehicle). Specifically, since the inter-vehicle distance between the host vehicle and the leading vehicle is relatively close to zero in the first following control of the leading vehicle, when the brake pedal 13*a* is operated during the following control of the leading vehicle, the inter-vehicle distance from the leading vehicle becomes large due to the operation. As a result, in a case in which the inter-vehicle distance between the host vehicle and the leading vehicle when the operation of the brake pedal 13*a* ends becomes larger than the predetermined threshold value E of the inter-vehicle distance, the setting control section 34 performs an update with the vehicle speed of the host vehicle when the operation of the brake pedal ends as a new vehicle speed setting. On the other hand, in a case in which the inter-vehicle distance from the leading vehicle when the operation of the brake pedal 13*a* ends does not become larger than the predetermined threshold value E, the setting control section 34 performs an update with the inter-vehicle time gap when the operation of the brake pedal ends as a new inter-vehicle time gap setting. Hereinafter, specific treatments by the setting control section 34 will be described with reference to FIG. 9.

Figure 9:
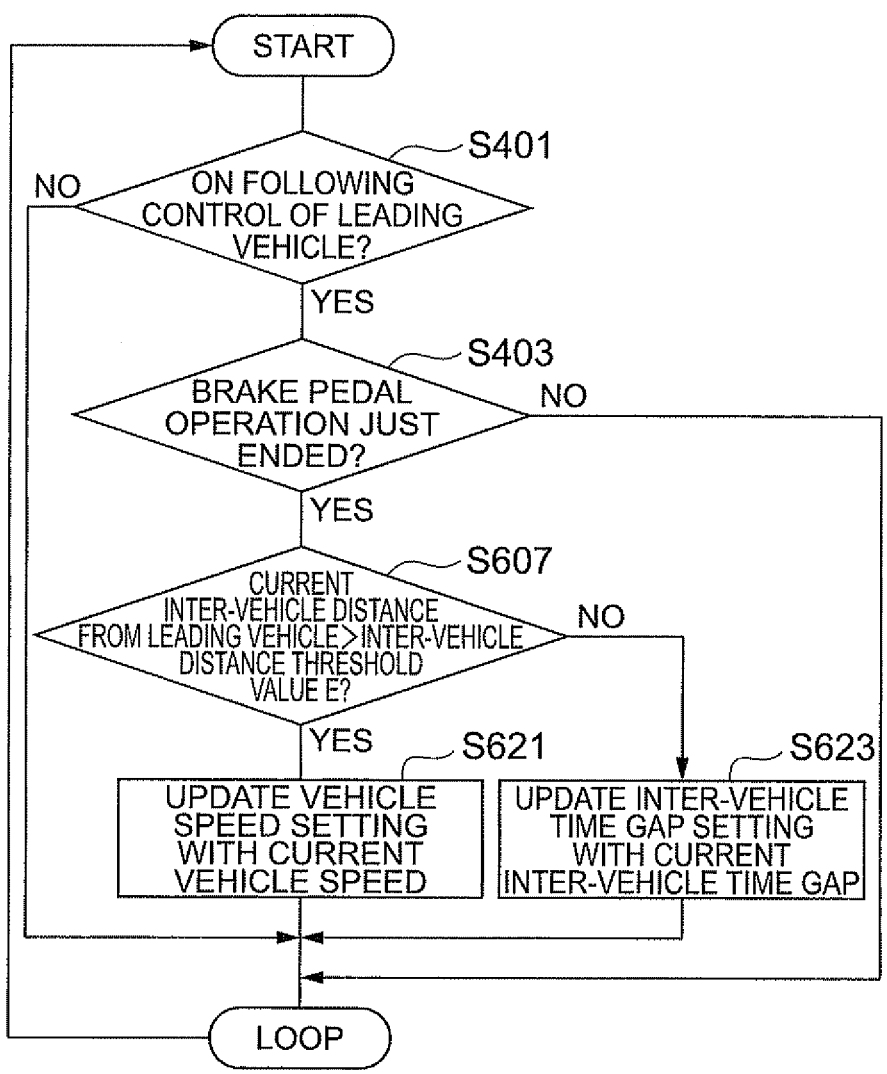
FIG. 9 is a flowchart showing the control of updating inter-vehicle distance setting and vehicle speed setting in the ACC system of a sixth embodiment.

As shown in FIG. 9, in the treatment by the ACC system 601, the determination treatment S407 in the treatment by the ACC system 401 (refer to FIG. 5) is replaced with another determination treatment S607.

In the treatment S607, the current inter-vehicle distance from the leading vehicle is obtained from the leading vehicle presence determination control section 31. In addition, the obtained inter-vehicle distance and the threshold value E of the inter-vehicle distance are compared (S607). The threshold value E is predetermined by the designer of the ACC system 601 based on the desired design concept and is stored in advance in the ROM of the ACC ECU 30. For example, the threshold value E is 100 m.

In the treatment S607, when the above inter-vehicle distance is larger than the threshold value E of the inter-vehicle distance ('Yes' in S607), the vehicle speed setting are updated in the same manner as the treatment S421 (refer to FIG. 5). In S621, the inter-vehicle time gap setting is not updated. On the other hand, in the treatment S607, when the inter-vehicle distance is not larger than the predetermined threshold value E ('No' in S607), the inter-vehicle time gap setting are updated in the same manner as the treatment S423 (refer to FIG. 5) (S623). In S623, the vehicle speed setting is not updated. In the treatment of FIG. 9, similar reference numbers are given to treatments similar or equivalent to the treatments in FIG. 5, and no duplicate description will be made.

Subsequently, the actions and effects of the ACC system 601 that performs the above treatments will be described.

The case in which the above treatment S621 is performed corresponds to a case in which, when the operation of the brake pedal 13a of the host vehicle ends, the inter-vehicle distance from the leading vehicle is larger than the threshold value B of the inter-vehicle distance (for example, 100 m). For example, in a case in which the leading vehicle becomes 100 m or further away when an operation of the brake pedal 13a ends, it can be considered that the driver of the host vehicle does already not recognize the leading vehicle as an object to follow. Therefore, when the brake pedal 13a of the host vehicle is operated in such a manner, it can be considered that the driver of the host vehicle depresses the brake pedal 13a with a simple desire of reducing the vehicle speed, and, at this time, it can be considered that the driver does not particularly desire to set the inter-vehicle time gap with the leading vehicle. Here, if updating of the vehicle speed setting is not attempted with the current vehicle speed, there may be cases in which the vehicle speed is again increased to follow the leading vehicle after the operation of the brake pedal 13a ends, which is not desired by the driver. Therefore, in the treatment S621, only the vehicle speed setting is updated, and the inter-vehicle time gap setting remains as it is, thereby achieving settings in compliance with an intention of the driver.

In addition, the case in which the treatment S623 is performed corresponds to a case in which, when the operation of the brake pedal 13a of the host vehicle ends, the inter-vehicle distance from the leading vehicle is smaller than the threshold value E of the inter-vehicle distance (for example, 100 m). In such a case, it can be considered that the driver of the host vehicle recognizes the leading vehicle as an object to follow. Therefore, when the brake pedal 13a of the host vehicle is operated in such a manner, it can be considered that the driver of the host vehicle depresses the brake pedal 13a with a simple desire to continue the following control of the leading vehicle with an extended inter-vehicle time gap. Therefore, in the treatment S623, similarly to the above treatment S123, only the inter-vehicle time gap setting is updated, and the vehicle speed setting remains as it is. Therefore, according to the ACC system 601, similarly to the ACC system 1, it is possible to set the vehicle speed setting and the inter-vehicle time gap setting in compliance with an intention of the driver. In addition, similarly to the ACC system 1, driver can perform intuitive operations for the inter-vehicle time gap setting that is one of the setting items of ACC.

Meanwhile, when the meaning of the threshold value E of the inter-vehicle distance is considered, the threshold value E of the inter-vehicle distance refers to the upper limit of the inter-vehicle distance from the leading vehicle that the driver of the host vehicle recognizes as an object to follow. That is, when the leading vehicle has a distance exceeding the threshold value E of the inter-vehicle distance away, it can be considered that the driver of the host vehicle does not recognize the leading vehicle as an object to follow. In the embodiment, the threshold value E of the inter-vehicle distance is a fixed value stored in advance in the ROM of the ACC ECU 30 of, for example, 100 m, but the threshold value E of the inter-vehicle distance may be, for example, a variable value varying with the vehicle speed of the host vehicle. In this case, as shown in FIG. 10A, a map relating the vehicle speed of the host vehicle and the threshold value E of the inter-vehicle distance is prepared in advance in the ROM of the ACC ECU 30, and the setting control section 34 may select a threshold value E of the inter-vehicle distance corresponding to the vehicle speed of the host vehicle with reference to the map in the treatment S607.

Figure 10:
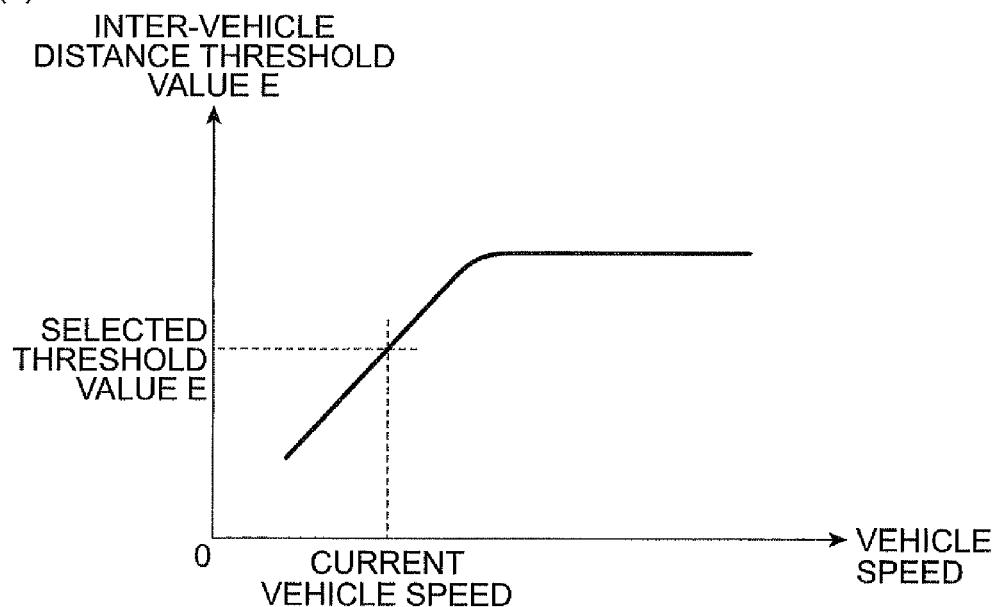
FIG. 10A is a graph showing a map of inter-vehicle distance threshold values used in the ACC system of FIG. 9.
FIG. 10B is a graph showing a map of inter-vehicle time gap threshold values used in the ACC system of FIG. 9.
Figure 10:
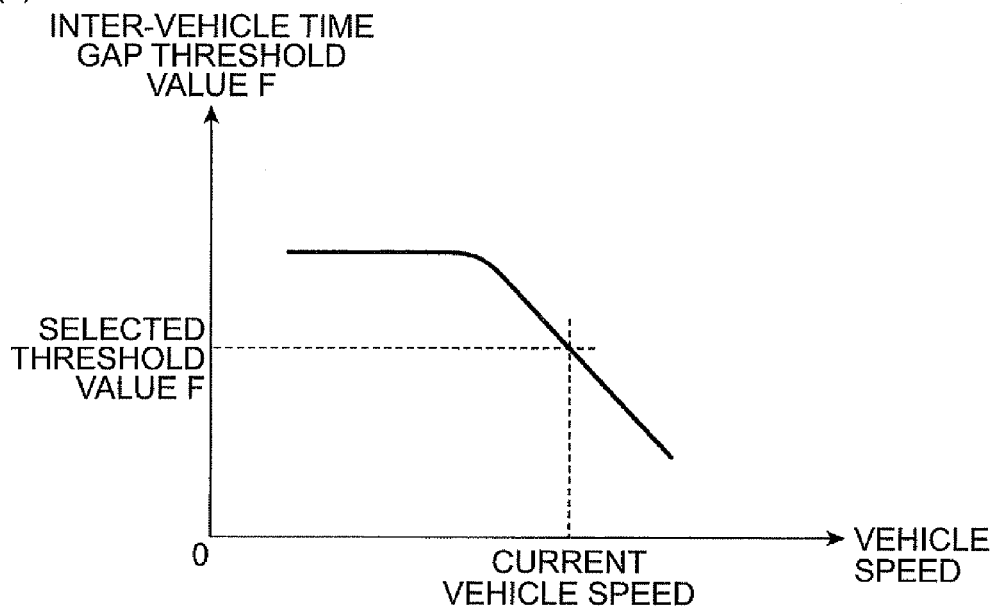

According to the map shown in FIG. 10A, the threshold value E of the inter-vehicle distance is proportionate to the vehicle speed of the host vehicle when the vehicle speed of the host vehicle is relatively slow, and the threshold value E of the inter-vehicle distance becomes constant when the vehicle speed of the host vehicle is relatively high so that threshold values E of the inter-vehicle distance suitable for the ordinary sense of a driver can be selected. Therefore, by employing such a map and using a threshold value E of the inter-vehicle distance suitable for the vehicle speed of the host vehicle, it becomes possible to set setting information more suited to the sense of the driver.

In addition, in the treatment S607, instead of the comparison of the inter-vehicle distance, the comparison of the inter-vehicle time gap may be used. In addition, in this case, the threshold value F of the inter-vehicle time gap of a comparison object may be a variable value varying with the vehicle speed of the host vehicle. In this case, as shown in FIG. 10B, a map relating the vehicle speed of the host vehicle and the threshold value F of the inter-vehicle time gap is prepared in advance in the ROM of the ACC ECU 30, and the setting control section 34 may select a threshold value F of the inter-vehicle time gap corresponding to the vehicle speed of the host vehicle with reference to the map and may compare the threshold value F of the inter-vehicle time gap and the current inter-vehicle time gap in the treatment S607. Meanwhile, the map shown in FIG. 10B is the map of FIG. 10A with the vertical axis simply replaced with the inter-vehicle time gap axis so that, similarly to FIG. 10A, it is possible to set setting information more suited to the sense of the driver.

The invention is not limited to the above first to sixth embodiments. It is also possible to employ in appropriate combinations of the respective algorithms of the treatments of the setting control section 34 shown in the first to sixth embodiments.

INDUSTRIAL APPLICABILITY

The invention relates to a vehicle travel control device that controls the vehicle speed of a host vehicle based on any of inter-vehicle distance setting and vehicle speed setting that are setting information set in advance, which makes it possible to reflect an intention of a driver by pedal operation in the setting information for vehicle travel control.

REFERENCE SIGNS LIST 1, 201, 301, 401, 501, 601 . . . ACC SYSTEM (VEHICLE TRAVEL CONTROL DEVICE), 10 . . . MILLIWAVE RADAR, 11 . . . VEHICLE SPEED SENSOR, 12a . . . ACCELERATOR PEDAL, 13A . . . BRAKE PEDAL, 33 . . . TRAVEL CONTROL SECTION, 34 . . . SETTING CONTROL SECTION, 35 . . . SETTING STORAGE SECTION, M0 . . . HOST VEHICLE, M1, M11, M12 . . . THE LEADING VEHICLE

The invention claimed is:

1. A vehicle travel control device that controls travel of a host vehicle based on any of a previously set inter-vehicle distance setting and a previously set vehicle speed setting, the device comprising:
   at least one processor that:
      updates the inter-vehicle distance setting and the vehicle speed setting individually in accordance with a pedal operation of a brake pedal in the host vehicle;
      selects setting information to be updated based on changes in travelling conditions of the host vehicle and/or changes in travelling conditions of a leading vehicle from a start of the pedal operation to an end of the pedal operation; and detects a deceleration of the leading vehicle; and when the deceleration of the leading vehicle exceeds a predetermined threshold value from the start of the pedal operation to the end of the pedal operation in the host vehicle during a following control of the leading vehicle;

selects the vehicle speed setting as the setting to be updated; and updates the vehicle speed setting in accordance with the pedal operation.

2. The vehicle travel control device according to claim 1, wherein, when the deceleration of the leading vehicle does not exceed the predetermined threshold value from the start of the pedal operation to the end of the pedal operation in the host vehicle during the following control of the leading vehicle, the at least one processor:

selects the inter-vehicle distance setting as the setting to be updated; and updates the inter-vehicle distance setting in accordance with the pedal operation.

3. The vehicle travel control device according to claim 1, wherein, when the inter-vehicle distance or an inter-vehicle time gap between the host vehicle and the leading vehicle at the end of the pedal operation becomes smaller than the inter-vehicle distance or the inter-vehicle time gap at the start of the pedal operation, the at least one processor:

selects the vehicle speed setting as the setting to be updated; and updates the vehicle speed setting in accordance with the pedal operation.

4. The vehicle travel control device according to claim 3, wherein, when the inter-vehicle distance or the inter-vehicle time gap between the host vehicle and the leading vehicle at the end of the pedal operation does not become smaller than the inter-vehicle distance or the inter-vehicle time gap at the start of the pedal operation, the at least one processor:

selects the inter-vehicle distance setting as the setting to be updated; and updates the inter-vehicle distance setting in accordance with the pedal operation.

5. The vehicle travel control device according to claim 1, wherein, when an amount of change in the speed of the host vehicle from the start of the operation of the pedals to the end of the operation of the pedals exceeds a predetermined threshold value, the at least one processor:

selects the vehicle speed setting as the settings to be updated; and updates the vehicle speed setting in accordance with the pedal operation.

6. The vehicle travel control device according to claim 5, wherein, when the amount of change in the speed of the host vehicle from the start of the pedal operation to the end of the pedal operation does not exceed the predetermined threshold value, the at least one processor:

selects the inter-vehicle distance setting as the setting to be updated; and updates the inter-vehicle distance setting in accordance with the pedal operation.

7. The vehicle travel control device according to claim 1, wherein, when an index indicating the relative relationship between the host vehicle and the leading vehicle changes to an extent exceeding a predetermined threshold value at the end of the pedal operation, the at least one processor:

selects the vehicle speed setting as the setting to be updated; and updates the vehicle speed setting in accordance with the pedal operation.

8. The vehicle travel control device according to claim 7, wherein, when the index indicating the relative relationship between the host vehicle and the leading vehicle does not change to an extent exceeding the predetermined threshold value at the end of the pedal operation, the at least one processor:

selects the inter-vehicle distance setting as the setting to be updated; and updates the inter-vehicle distance setting in accordance with the pedal operation.

9. The vehicle travel control device according to claim 7, wherein the index indicating the relative relationship is a difference in the vehicle speed between the host vehicle and the leading vehicle.

10. The vehicle travel control device according to claim 7, wherein the index indicating the relative relationship is the inter-vehicle distance or the inter-vehicle time gap between the host vehicle and the leading vehicle.

\* \* \* \* \*